United States Patent Office 3,163,499
Patented Dec. 29, 1964

3,163,499
BRAZE CLAD COPPER AND METHOD OF PRODUCING SAME
Robert S. Bray, Wolcott, Conn., assignor to Chase Brass & Copper Co., Incorporated, Waterbury, Conn., a corporation of Connecticut
No Drawing. Filed Dec. 1, 1960, Ser. No. 72,864
26 Claims. (Cl. 29—191.2)

This invention pertains to braze clad copper and copper alloys which possess improved characteristics in respect to their ability to be joined under proper brazing or welding conditions. More particularly, the invention relates to copper and copper alloy mill stock, the surface of which has adhered to it a thin film or coating of a high phosphorus cuprous powder, the purpose of the film being to promote the formation under brazing or welding conditions of a bond between basis metal members, one or both of which is or are provided with the type of cladding hereinafter described. Under optimum conditions the junction produced in uniting such members is of the true diffusion type wherein the bond or junction is substantially free of any separate and distinct metallic phase or crystalline structure different from the surrounding matrix of the components being joined.

As used herein the term "mill stock" denotes any of a wide variety of forms or shapes of fabricated or semifabricated metal including sheet, strip, angle, tube or bar stock. As already suggested hereinabove, the term "diffusion" bond designates a type of metal-to-metal joining under brazing or welding conditions where the resulting joint, as well as adjoining original metal, is virtually homogeneous in its metallographic structure.

Metal structures fabricated by diffusion bonding possess substantial advantages over conventionally brazed structures in regard to strength, corrosion resistance, dimensional limitations and mechanical problems of fabrication due to alignment and tolerance. It is also possible to reduce substantially the amount of weld metal required to effect satisfactory union of the component parts, thus affording still further savings.

The bond-promoting clad metals of this invention are cuprous basis metals having adhered to the surface thereof a film of phosphorus-bearing cuprous powder dispersed in a suitable carrier which serves to bind the powder mechanically to the basis metal temporarily, that is until the clad metal components are welded together. This bonding film is characterized in particular, insofar as concerns the cuprous powder component, by the fact that such powder is present in the film in the form of discrete, unfused particles forming a uniform coating on the surface of the basis metal. The carrier component of the cladding is a polymerized resinous material, initially in liquid form in which the cuprous powder is dispersed, which permits application of the cladding by conventional painting or spraying techniques.

Component parts thus coated are joined or bonded together simply by placing them in contact with each other or with other unclad component parts of a compatible basis metal, and then raising the temperature of the parts to a suitable degree under nonoxidizing conditions to cause fusion to occur at the points of contact.

The braze clad metal herein described has unusual properties in respect to wide tolerance to working or forming operations performed upon it after the cladding has been applied. This permits a more economical and uniform coating of cladding to be applied to the basis metal while still in the sheet or strip form, and thereafter working the metal into the desired configuration by such fabrication operations as drawing, rolling, bending and cutting. This is a tremendous advantage of course since it makes possible the application of a braze cladding to a basis metal while the latter is still in a starting or unformed condition, whereby the cladding may thus be applied in localities which, in the completed or formed article, it would be most difficult if not impossible to reach. It provides a further advantage in that a more uniform coating of the cladding can be obtained through rolling of the basis metal after the cladding has been applied, whereby better distribution of the cladding material is obtained.

A unique feature of the clad metal herein disclosed is that not only is a very small amount of the cladding material needed for effecting bonding of parts to be joined, but in fact it is essential in achieving true diffusion bonding not to have more than certain hereinafter stated amounts of cladding present. For another thing, excess cladding metal in addition to producing brittle junctions unnecessarily increases the weight, as well as the cost of the clad mill stock. It also increases the volume of metal in a composite structure, particularly in the area of the joint formed between them, which is usually not desired although often unavoidable with more conventional brazing techniques and materials.

Another outstanding advantage of the braze clad alloys of the invention is the fact that the cladding can be readily removed or stripped from selected areas or from entire surfaces by suitable solvents. This can be done not only on the as-coated mill stock, but on components formed from such stock after rolling to reduce thickness, and even after annealing. This is particularly important where scrap is remelted and it is necessary to meet compositional specifications in producing a basis metal. Inclusion of any substantial amount of clad metal in the furnace can easily cause the composition of the alloy to fall outside the desired analysis limits.

The use of phosphorus-copper alloy powder as a braze clad for a basis metal has been tried generally heretofore. In all known instances, however, these attempts have been directed toward methods of initially fusing the powder cladding to the basis metal to produce on the surface of the basis metal a continuous, unified, fused layer of cladding alloy. Metal thus clad does not, however, tend to produce a true fusion bond or junction having homogeneous microcrystalline structure when the components are welded or brazed together. Rather, a typical braze joint is produced exhibiting a definite secondary phase in the metallographic structure of the joint. It has also proved extremely difficult to control the thickness of the cladding as heretofore proposed because, in heating the basis metal and powdered cladding alloy to obtain the desired coalescence or agglomeration of the powder particles, the alloy becomes quite fluid and the slightest tilting of the basis metal causes the coating to run off from high points and to accumulate at low ones. In the case of tubular or angular stock, of course, it is virtually impossible using the previous cladding method to get uniformity of thickness at all points on the surfaces because of this. And once the basis metal is clad in the manner heretofore proposed, it is practically impossible to remove the cladding for scrap recovery purposes. As a result, remelted scrap will show an excessive phosphorus content for most purposes.

The basis metals to which the cladding may be applied in accordance with the invention include phosphorized copper, oxygen-free copper or tough pitch copper and dilute copper alloys, such as silver-bearing copper, zirconium-copper and cadmium-copper. Also, low nickel content phosphorus-copper alloys containing not over about 1% nickel are useful. High cupro-nickel alloys such as the 70–30 and 90–10 alloys do not provide good weld joints, as the junction produced is excessively brittle. With brasses or copper-zinc alloys containing less than about 15% zinc, satisfactory welds are achieved, but higher zinc contents in the basis metal are unsuitable, apparently because of the high vapor pressure of the zinc at welding temperature. Copper-nickel-silicon alloys also do not appear to be suitable as a basis metal, presumably because of the thin film of silica which prevents wetting.

For many applications the optimum basis metal appears to be Baltimore high phosphorus (B.H.P.) copper. This is essentially a phosphorus-deoxidized copper in which the nominal content of the phosphorus is about 0.025%, although this figure may vary in practice from around 0.01 to 0.04%.

The alloys found most useful for producing the powder cladding are those having a phosphorus content of from 10% to 15%, the balance being substantially all copper. The useful range, however, may extend to alloys containing from around 6% up to around 16% phosphorus. A standard, generally available alloy containing a nominal 15% phosphorus is quite brittle, therefore easily reduced to powder form, and gives excellent diffusion welded joints. Some advantage might seem to be presented by using the eutectic composition containing 8.38% phosphorus because of its lower melting point. But such alloy is not nearly so brittle as those of higher phosphorus content, and is accordingly more difficult to reduce to powder form. For these reasons the preferred alloys for the cladding material are those having higher phosphorus content and particularly the 15% phosphorus alloy.

The particle size of the powdered alloy comprising the cladding material is not critical and may extend over a rather wide range. Excellent results are obtained with the use of powder where the particle size runs from something less than 1 micron to 10 or more microns. Powder containing coarser particles, as large as 75 microns, gives satisfactory results although it is perhaps not quite so easy to use as a more uniform, finer material.

A convenient way of obtaining the desired cladding material is to grind the cladding alloy in the presence of the vehicle which is ultimately to be used for spreading the powder on the basis metal and mechanically adhering it thereto.

Various liquid vehicle compositions for suspension of the cladding alloy powder may be used, provided they will withstand the mechanical working involved in forming the parts from the clad metal without causing the cladding to flake or slough off, and provided also that such vehicles do not produce a decomposition product inimical to the bonding process when the coated metal is either heated for annealing purposes or for purposes of bringing it up to the brazing or fusion temperature. Polymerized methacrylate resins, and particularly methyl methacrylates, have been found generally suitable for suspending the alloy powder in order to enable it to be applied in convenient form by spraying, with a brush or roller, or by dipping. Several of these methacrylate materials are available, one such being sold commercially under the trade name "Trilac" which is a methyl methacrylate composition produced by Imperial Chemical Industries.

Suitable solvent thinners are employed to render the vehicle sufficiently fluid to permit application, but these evaporate to leave the powdered brazing alloy adhered to the surface of the basis metal by the methacrylate carrier. Trichloroethylene is an excellent solvent for methyl methacrylate vehicles and may be used to obtain a consistency of the vehicle suitable for spraying in an ordinary paint spray gun.

The amount of powder cladding material in suspension in the vehicle is not critical within a range in which the ratio of metal powder to resin solids is on the order of from 16:1 to 4:1 by weight. This is roughly equivalent to 65% to 30% by volume of phosphorus-copper alloy in the coating composition. The amount of the thinner can be disregarded in this ratio as it is added merely as a means of getting a suitable fluidity for spraying or otherwise coating and, as mentioned above, is volatilized after application.

The total amount of phosphorus-copper cladding alloy present on the basis metal is definitely critical in obtaining a true diffusion bond when welding basis metal parts. It appears that a quantity of this alloy of from 0.010 to 0.015 gram per square inch of basis metal surface provides optimum conditions, whereas 0.025 gram per square inch is too much and 0.007 gram per square inch is too little for obtaining the desired diffusion welded joint. The most satisfactory welded joints have been obtained for B.H.P. copper using 0.013 gram per square inch of 15% P—Cu alloy powder as the cladding. The figures here given for the amount of cladding alloy represent totals for the joint area, and the amount of cladding alloy specified may initially be all on one of two surfaces to be joined, or it may be distributed between them in any ratio.

The steps involved in preparing the braze clad mill stock or basis metal are simply those of cleaning the surface of the metal to remove any lubricant that may be present, and then coating the surface with the suspension of powdered P-Cu alloy in the vehicle. Spraying the coating on the basis metal is the preferred method of applying it, particularly by electrostatic spray techniques, but it is also possible to apply it by other means such as roller coating, dipping and brushing.

If the basis metal is to be used directly without further rolling to reduce thickness after the application of the braze cladding, then the amount of braze cladding must fall within the previously mentioned limits of weight per square inch of surface area. On the other hand, if after the coating has been applied, the clad metal is subjected to a series of rolling operations to reduce the thickness of the original metal, then the initial deposit of cladding material on the surface of the starting metal will necessarily be substantially heavier in order that the concentration in the finally rolled product will fall within the desired limits. Generally it is desirable to include the rolling operation to reduce the thickness of the clad metal as this has the effect of making the clad material more resistant to scuffing and handling without damage to the cladding film. The rolling is performed after the coating has dried, and normally it is desirable to effect from 50% to 75% reduction in thickness of the metal, and even more in some instances. This rolling serves also to provide a uniform controlled final thickness of coating across the surface of the basis metal.

In order to render the clad metal sufficiently ductile for subsequent forming operations, it must be annealed. This is generally done after rolling to final thickness. Any temperature can be used which will soften the basis metal, up to a maximum of about 625° F. The lower limit will depend on the material and degree of previous cold rolling and may be as low as around 350° to 400° F. A temperature of about 600° F. is found to be optimum in most instances.

The annealing time will of course vary with the nature of the basis metal, its thickness and the extent of previous mechanical working to which it has been subjected. From around 3 minutes to 30 minutes is the average time required to obtain the desired softening of the metal, but it should be borne in mind that the object of this annealing is solely to soften the copper basis metal itself and thus render it capable of being formed into various shapes which would not be possible in the as-rolled condition. The annealing temperature and time should very definitely not be such as to cause melting of the applied P—Cu layer, nor any agglomeration of the individual particles or reduction of the resin binder to an extent where it no longer is able to serve mechanically to adhere the alloy powder to the basis metal.

In producing a weld, sheets or formed parts are assembled, one or more of whose surfaces is provided with the cladding material in such amount as to provide the equivalent of the previously mentioned quantities of braze material per unit area at the joint. Thus, if two sheets, both being clad to the same degree are to be joined, the amount of P—Cu alloy per unit area per sheet should be one-half that specified hereinabove. However, it is quite practical to join two sheets or components where only one of them has been clad, in which event the total specified amount of braze cladding per unit area must be present on the one sheet or component.

The welding together of the clad components is performed by heating them, while in contact with each other, in a reducing or inert atmosphere to a temperature between 1600° and 1850° F. for a time varying with the basis metal, temperature and physical characteristics of the components. From about 3 to 15 minutes is normally required in this operation. In this joining, it is not necessary to use any significant pressure but simply enough to assure good contact between the mating surfaces. Nor is it necessary to use any flux as the P—Cu alloy cladding is self-fluxing. In this manner, the components are firmly bonded by the process of diffusion of the P—Cu alloy into the basis metal members and the resulting bond is such that litle or no residual second-place alloy remains and the microstructure of the assembly is practically that of a continuous member.

In order to provide a fuller understanding of the invention, specific examples of braze clad copper alloy stock illustrating actual results obtained will now be given.

The basis metal employed was annealed B.H.P. copper sheet of thicknesses of 0.020" and 0.040" as the starting materials. The cladding was prepared by grinding 15% P—Cu alloy to powder of approximately 5 microns in size in "Trilac" (methyl methacrylate) cut with trichloroethylene. Several determinations of the amount of P—Cu alloy per square inch of surface of basis metal were made in which some of the sheets were used as-sprayed to produce a weld joint, while others were rolled to effect 50% and 75% reductions in thickness of the basis metal after the braze cladding was applied and allowed to dry. The results obtained are summarized in Table I.

*Table I*

| Example | 15% P-Cu, g./in.² | Nature of Weld Joint Obtained |
| --- | --- | --- |
| 1. As sprayed | 0.0166 | Satisfactory joint. |
| 2. As sprayed | 0.0283 | Appearance of continuous 2nd phase in joint. |
| 3. Sprayed and rolled from 0.021" to 0.010". | 0.0128 | Good. |
| 4. Sprayed and rolled from 0.040" to 0.010". | 0.0068 | Insufficient bonding. |
| 5. Sprayed and rolled from 0.020" to 0.010". | 0.0083 | Do. |

In the foregoing table, the amount of P—Cu alloy powder reported represents the total for the joint surfaces. In practice, one-half the amount was applied to each surface of the components to be joined, but any other distribution, including that where all of the cladding material is on one surface, works equally as well.

Example #1 in Table I employed as-sprayed sheet stock which was welded together to produce a bond. Good diffusion bonded joints were produced, however more second-phase remained in the joints than is desired for optimum results under the invention. More P—Cu alloy cladding per unit area produces a joint useful for many purposes but one having a continuous second phase of filler material, as shown by Example #2.

Example #3 was part of the same starting material as used in #2 but rolled from 0.021" as-sprayed to 0.010" final thickness. This rolling is accomplished with no difficulty and without disruption of the cladding layer in any way. The resulting welded joint using this material represents about the optimum condition for the bonding process with the material involved. A photomicrograph of the bonded joint shows essentially no second phase but rather a generally complete diffusion bond with grain boundaries of the basis metal growing across the joint in many places. The rolled stock also exhibits substantially better resistance to scuffing and abrasion than the unrolled stock, yet the cladding can still be removed even after annealing by solvent action, as by using trichloroethylene.

As indicated in the table, the material used in Example #4 was initially 0.040" thick, which was clad with the P—Cu alloy powder dispersed in the lacquer vehicle and then subjected to a 75% reduction by rolling to produce a final stock of 0.010" thickness. The material in Example #5 was initially 0.020" thick, clad with the bond-promoting alloy and reduced 50% by rolling to give a final stock thickness of 0.010". In both of these cases, the coating of cladding material was sprayed onto the stock and air dried, and the finished stock was annealed after rolling at a temperature of 600° F. Using one piece of clad material from either of Example #4 or 5, and one piece of unclad starting stock, the joint produced was spotty. However, when two pieces of clad stock from either of these examples were welded together, the joint was sound. Metallographic examination of the joint obtained in using two pieces of material each coated to provide a P—Cu powder content equal to that in Example #4 showed close resemblance to the joint obtained in Example #3 where the cladding alloy approximated 0.013 gram per square inch. Similarly, examination of the joint obtained in using two pieces of stock each coated to provide a P—Cu powder content equal to that in Example #5 showed close resemblance to the joint obtained in Example #1.

In each of the foregoing examples a weld was effected at various temperatures of from 1700° F. to 1850° F. and the samples were held at welding temperature for periods of from 5 to 15 minutes in a hydrogen atmosphere. In all cases, operation within the ranges given is satisfactory and similar bonds are produced.

Fatigue tests on bonded joints produced in accordance with the invention show greatly improved strength, particularly at elevated temperatures. In these tests, specimens were prepared by diffusion bonding pairs of 1¾" diameter flanged cups drawn from B.H.P. copper clad with 15% P—Cu powder alloy dispersed in methyl methacrylate using approximately 0.013 gram per square inch (total) of the cladding alloy on the basis metal. The chamber thus formed by each set of paired cups was provided with a duct connecting it with an air manifold. The test specimens were then placed in a constant temperature oil bath at 250° F. and the pressure in the specimen chambers cyclically varied from 0 to 60 p.s.i. at 6 second intervals. Up to 133,000 cycles without failure were obtained with some samples, and none showed any failure in the joint itself although several developed fatigue cracks in the metal away from the bond or joint area after about 80,000 to 85,000 cycles. By comparison, in similar tests employing cups of the same basis metal joined by various types of conventional lead-tin solder, a maximum cycles-to-failure of around 40,000 was achieved and the average was much lower, usually around 3,000 to 8,000. And in every case failure in these samples occurred in the joint.

The braze clad material of the invention is especially useful in the production of heat exchange units such as automobile radiators where the water tubes pass through and must be bonded to closely spaced cooling fins. Comactness, good thermal conductivity, and vibration and corrosion resistance particularly at moderate temperatures are of utmost importance in this application, and braze clad copper mill stock produced in accordance with the examples given hereinabove permit radiator core structures to be readily produced fully satisfying these requirements.

What is claimed is:

1. A clad article consisting essentially of a basis metal selected from the group consisting of copper, phosphorized copper, copper-zinc alloys having up to 15% zinc, dilute silver, zirconium and cadmium alloys of copper, and copper-nickel-phosphorus alloys having up to 1% nickel, said article having on its surface a cladding of cuprous metal in finely divided powder form, said powdered cuprous cladding having a phosphorus content of from 6% to 16%, and a polymerized methacrylate resin carrier in which said cladding metal is dispersed to provide on said basis metal a substantially uniform film of discrete, unfused particles of cladding metal adhered to the surface of said basis metal by said resin carrier.

2. A clad article as defined in claim 1, wherein said carrier is a polymerized methyl methacrylate resin and said cladding metal is present in the amount of about .013 gram per square inch of coated surface.

3. A clad article as defined in claim 1, wherein said carrier is a polymerized methyl methacrylate resin and said cladding metal is present in the amount of about .0065 gram per square inch of coated surface.

4. A clad article as defined in claim 1, wherein said cladding metal powder particles range in size from about up to a maximum of about 75 microns.

5. A clad article as defined in claim 1, wherein said cladding metal powder particles range in size from about to 50 microns.

6. A clad article as defined in claim 1, having on its surface a fusion-bond promoting cladding of said phosphorus bearing copper powder dispersed in said resinous carrier to provide an adherent film of said powder on the surface of said basis metal, wherein the powder is present in discrete, unfused particulate form, the ratio of weights metal powder to resin solids in said carrier being from about 16:1 to 4:1.

7. A clad article consisting essentially of a basis metal selected from the group consisting of copper, phosphorized copper, copper-zinc alloys having up to 15% zinc, dilute silver, zirconium and cadmium alloys of copper, and copper-nickel-phosphorus alloys having up to 1% nickel, said article having on its surface a fusion-bond promoting cladding of a copper-phosphorus alloy having from 6% to 15% phosphorus content, said copper-phosphorus alloy being present in discrete, unfused particulate form in a polymerized methacrylate resinous carrier in amount from 0.010 to 0.025 gram of copper-phosphorus alloy per square inch of basis metal surface.

8. The clad article as defined in claim 7, wherein the particle size of the cladding alloy powder ranges from about 1 to 75 microns.

9. A rolled and annealed sheet metal selected from the group consisting of copper, phosphorized copper, copper-zinc alloys having up to 15% zinc, dilute silver, zirconium and cadmium alloys of copper, and copper-nickel-phosphorus alloys having up to 1% nickel, said sheet metal having on its surface a cladding film of high phosphorus copper powder dispersed in a polymerized methacrylate resin carrier, said powder and resin carrier having been applied to said sheet metal prior to the final annealing and rolling thereof, said powder being adhered to said sheet metal by said resin carrier and the rolling of said sheet and being present in the form of discrete, unfused particles.

10. A cuprous sheet metal as defined in claim 9, wherein the sheet has been reduced in thickness by at least 50% subsequent to the application of said cladding powder and resin carrier.

11. A cuprous sheet metal as defined in claim 9, wherein the resultant cladding metal is present in the amount of from 0.010 to 0.016 gram per square inch.

12. A cuprous sheet metal as defined in claim 9, wherein the resultant cladding metal is present in the amount of from 0.005 to 0.008 gram per square inch.

13. The method of preparing a fusion-bond promoting clad basis metal selected from the group consisting of copper, phosphorized copper, copper-zinc alloys having up to 15% zinc, dilute silver, zirconium and cadmium alloys of copper, and copper-nickel-phosphorus alloys having up to 1% nickel, which method comprises coating a surface of said basis metal with a thin film of a high phosphorus bearing cuprous cladding metal in powder form suspended in a liquid polymerized methacrylate resin base carrier, and allowing said carrier to dry to effect adherence of the powder to said basis metal in the form of discrete, unfused particles.

14. The method as defined in claim 13, wherein said resin base carrier is composed of a polymerized methyl methacrylate resin and a solvent therefor.

15. The method as defined in claim 13, wherein the weight ratio of cladding metal powder to resin solids in said carrier is from about 16:1 to 4:1.

16. The method as defined in claim 13, wherein said powdered cladding metal has a phosphorus content of from around 6% to 16%.

17. The method as defined in claim 13, wherein said powdered cladding metal is 15% phosphorus-copper and of a particle size ranging from about 1 to 75 microns, said powdered cladding metal comprising from about 65% to 30% of the volume of said carrier.

18. The method of preparing a fusion-bond promoting clad basis metal selected from the group consisting of copper, phosphorized copper, copper-zinc alloys having up to 15% zinc, dilute silver, zirconium and cadmium alloys of copper, and copper-nickel-phosphorus alloys having up to 1% nickel, which method comprises dispersing over the surface of the basis metal a thin film of cladding metal in powder form suspended in a nonoxidizing polymerized methacrylate resin carrier, wherein said cladding metal is a high phosphorus-copper alloy and is present in discrete particle form, allowing said carrier to dry and then rolling said clad basis metal to reduce its thickness.

19. The method of preparing a bond-promoting clad basis metal selected from the group consisting of copper, phosphorized copper, copper-zinc alloys having up to 15% zinc, dilute silver, zirconium and cadmium alloys of copper, and copper-nickel-phosphorus alloys having up to 1% nickel, which method comprises spraying the surface of said basis metal with a liquid composition comprising a polymerized methacrylate resin dissolved in a solvent therefor, coating the surface of the basis metal with said liquid composition and allowing it to dry, rolling the basis metal to reduce the thickness thereof and then annealing the same at a temperature sufficiently high to render the basis metal workable but not so high as to cause fusion or agglomeration of the powder particles in said cladding or to completely volatilize and remove the resin.

20. The method as defined in claim 19, wherein the annealing temperature ranges from around 350° to 625° F.

21. The method as defined in claim 19, wherein said phosphorus-copper cladding alloy contains about 10% to 15% phosphorus.

22. The method as defined in claim 21, wherein said powder cladding has a particle size of from about 1 to 50 microns.

23. The method as defined in claim 22, wherein the resulting coating contains from about 0.010 to 0.016 gram per square inch of said powder cladding.

24. The method as defined in claim 22, wherein the resulting coating contains from about 0.005 to 0.008 gram per square inch of said powder coating.

25. The method of joining metal members selected from the group consisting of copper, phosphorized copper, copper-zinc alloy having up to 15% zinc, dilute silver, zirconium and cadmium alloys of copper, and copper-nickel-phosphorus alloys having up to 1% nickel; which method comprises providing on the surface of at least one of said members a bond-promoting cladding comprising a powdered cuprous metal dispersed in a dried, nonoxidizing resinous carrier, said cladding metal having a phosphorus content of from 6% to 16% and being present in said carrier as a uniform film of discrete, unfused particles, placing said metal members in contact with each other and bonding them together in a nonoxidizing atmosphere at a temperature of from 1600° F. to 1850° F.

26. The method as defined in claim 25, wherein the members are held at said welding temperature for a period of from 3 to 30 minutes.

References Cited in the file of this patent

UNITED STATES PATENTS

| | | |
|---|---|---|
| 2,289,614 | Wesley | July 14, 1942 |
| 2,408,515 | Hopkins | Oct. 1, 1946 |
| 2,707,323 | Watson | May 3, 1955 |
| 2,737,463 | Lanton | Mar. 6, 1956 |
| 2,978,799 | Benteler | Apr. 11, 1961 |